United States Patent

Rebhan et al.

[11] Patent Number: 6,161,385
[45] Date of Patent: Dec. 19, 2000

[54] TURBOMACHINE AND METHOD OF USE

[75] Inventors: Dieter Rebhan, Albbruck; Jost Braun, Waldshut-Tiengen, both of Germany; Thomas Zierer, Ennetbaden; Stefan Rofka, Nussbaumen, both of Switzerland

[73] Assignee: Asea Brown Boveri AG, Baden, Switzerland

[21] Appl. No.: 09/420,414

[22] Filed: Oct. 19, 1999

[30] Foreign Application Priority Data

Oct. 20, 1998 [EP] European Pat. Off. .............. 98811052

[51] Int. Cl.⁷ .................................................. F01K 13/02
[52] U.S. Cl. .................................. 60/646; 60/650; 60/657
[58] Field of Search ............................. 60/645, 646, 650, 60/657

[56] References Cited

U.S. PATENT DOCUMENTS 4,357,801  11/1982  Wahl, III ............................... 60/646 X
5,533,337  7/1996  Kusayama ............................. 60/646 X
5,743,094  4/1998  Zimron et al. ............................. 60/646

Primary Examiner—Hoang Nguyen
Attorney, Agent, or Firm—Burns, Doane, Swecker & Mathis, L.L.P.

[57] ABSTRACT

A turbomachine, in particular a gas turbine, is in the traditional manner provided with air cooling of the components that are subject to a high thermal stress. The cooling system (21, 31, 41) is provided with elements through which another medium (25, 35, 45), for example water or steam, can be added to the cooling system during peak demand. This medium displaces cooling air (26, 36, 46) from the cooling system, the air being then available additionally in a heat generator (2, 4). This means that more fuel (12, 13) can be added without increasing the hot gas temperature ($T_1$, $T_3$) at the turbine inlet (301, 501), and the power is increased. The quantity of the medium added to the cooling system is controlled by control elements (24, 34, 44) as a function of a control deviation ($P_{set}-P_{act}$) of the power.

21 Claims, 2 Drawing Sheets

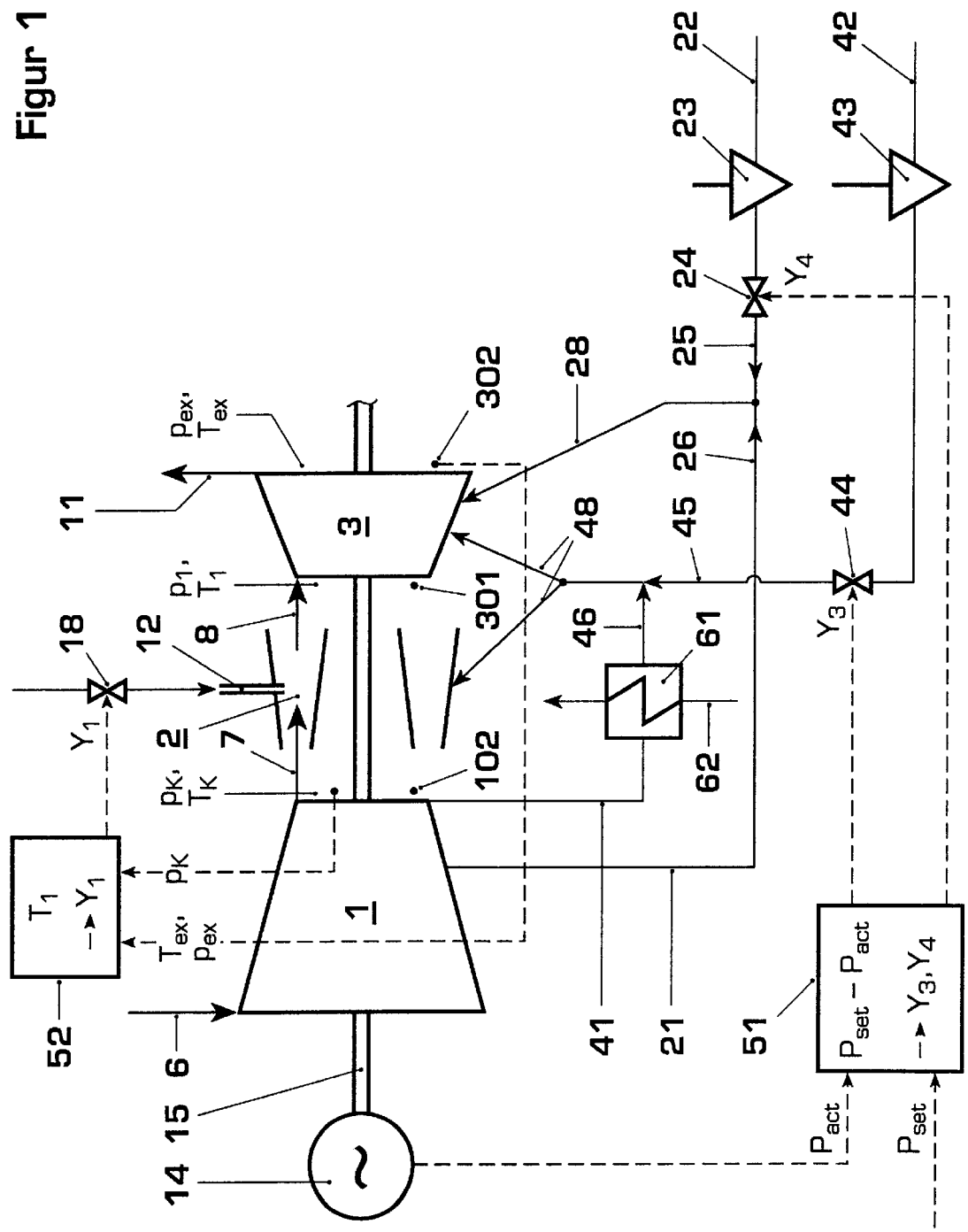
Figur 1

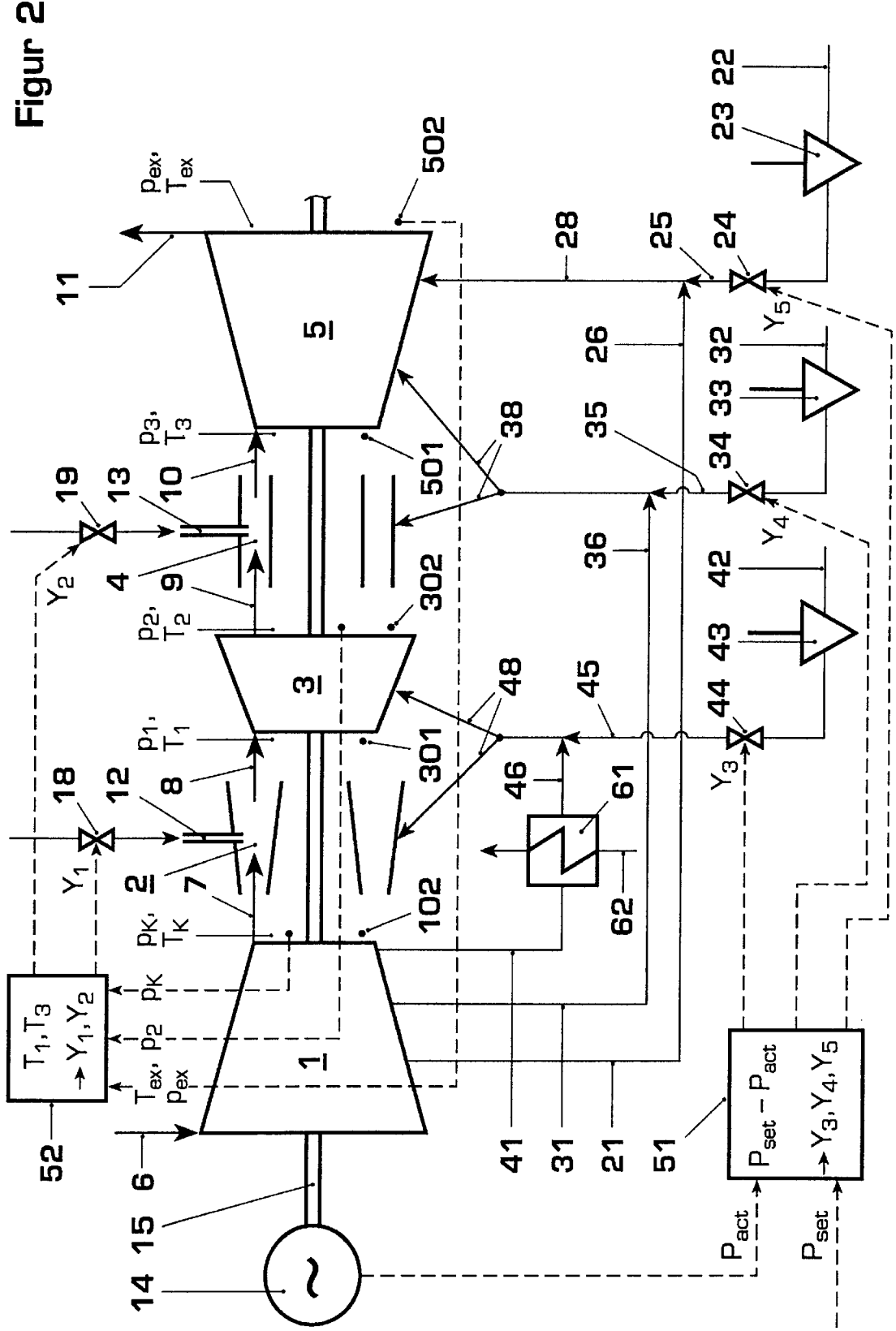
Figur 2

TURBOMACHINE AND METHOD OF USE

BACKGROUND OF THE INVENTION

1. Field of the Invention

The invention relates to a turbomachine, and a preferred use of a turbomachiine.

2. Brief Description of the Related Art

In today's deregulated electricity markets it is lucrative to provide reserves to cover peak demand or to bridge resource failures. Under certain circumstances it may be possible to generate more than half of the income with only a few percent of the electrical energy produced daily for the basic and intermediate load.

Peak load resources can be made available in different ways. One way, the provisioning via peak demand of hydroelectric power plants, is for many reasons only possible in the rarest of cases. Technologies such as air cell turbines so far are still considered exotic and, likely will continue to be so into the far future.

For this reason, peak load resources are also made available in thermal plants. This is, for example, accomplished in that power plants are operated in a basic load operation somewhat below full load, for example at 90 to 95% of their nominal power; depending on the type of installation, reserve power then can be mobilized at various speeds. Sometimes gas turbine power plants that can be quickly started up are provided. But both of these approaches have the result that capacities installed at high cost are only incompletely utilized.

In the case of gas turbines—both in solo operation and as a part of combination systems—there is the possibility of operating these machines at times with a more powerful firing device under a type of overload. For this purpose, on the one hand, the hot gas temperature at the turbine inlet can be elevated briefly by several degrees. This method can be implemented without additional equipment expenditure, but is not economical to the extent that it results in a substantial shortening of component life in the hot gas path.

Another possibility is the introduction of water or steam into the hot gas, preferably in the combustor. The reduction in the hot gas temperature achieved by this makes it possible to add more fuel in order to again increase the hot gas temperature to the design point. This method actually means slight losses in economy because of the latent heat of the water steam removed with the waste gas; but, in view of the high prices for peak demand electricity obtainable on the market, such a temporary loss of efficiency can be tolerated.

U.S. Pat. No. 4,928,478 describes a process in which process steam is produced in a waste heat boiler. Part of the steam, which is, for example, not used as a process steam, can be fed to the combustor of a gas turbine. Naturally, the losses in efficiency will be lower if steam from a waste heat boiler is used to increase the power. On the other hand, it also should be noted that the steam generated there can be used substantially more efficiently in the steam turbine of a combination power plant. But such methods nevertheless are very well suited to spontaneously make available additional power.

The introduction of water or steam into the hot gas of a steam turbine on the one hand is limited when the pressure ratio rises above the mass because of additional mass flux. In addition, the introduction of water or steam into the combustor—frequently also directly in the flame zone—interferes with combustion. Especially in connection with premix burners that are operated with a lean mixture, as described, for example, in EP 0 321 809, this may lead to undesired, negative effects on flame stability.

EP 0 795 685 describes the introduction of steam into the working fluid of a gas turbine without inducing negative effects on combustion. Steam generated in a waste heat boiler is used to cool the components subject to a high thermal stress, and after the components have been cooled, the working fluid is added. In addition to an increase in the mass flux through the turbine, an increase in power is also achieved in that the cooling air mass flux necessary for conventional cooling of the components in the combustor and turbine that are subject to a high thermal stress is in this case also directly available to thermal power conversion.

The steam cooling described in EP 0 795 685 does indeed offer a superior cooling effectiveness, but the safety of the cooling leaves room for criticism. A conventionally cooled gas turbine, in which part of the compressed air is branched off and is added through a cooling system to the components subject to high thermal stress, provides inherent safety in that as long as the machine rotates at least a minimum amount of cooling air is available, in particular also after an emergency shut-down. In the case of the steam cooling proposed in EP 0 795 685, in contrast, a number of components may cause immediate break-down of the cooling during operation of the gas turbine, resulting in major damage.

In this regard, GB 2 236 145, for example, proposes to provide an option that would make it possible on a case by case basis to also use compressor air for cooling in a gas turbine with steam-cooled components. EP 0 684 369 finally proposes to connect the cooling system, without any intermediate shut-off elements, with a tapping point on the compressor that has a suitable pressure. This cooling air system is provided with means to introduce steam into the cooling system that displaces air from the cooling system, which results, due to the low cooling air requirement, in a higher power of the gas turbine.

According to EP 0 684 369, the steam supply conduit is provided with a control valve, and a measuring point for the air quantity is integrated in the cooling air system. The steam quantity used for cooling is thus controlled in a defined ratio to the air quantity. Although the solution proposed in EP 0 684 369 is inherently safe with respect to cooling, to the extent that in case of a failure of the steam supply the corresponding amount of compressor air will be immediately available for cooling, the document relates to a steam-cooled gas turbine. In spite of all of the above mentioned advantages, the steam cooling during continuous operation often has the crucial disadvantage that large quantities of processed, highly pure water must be continuously provided in continuous operation.

This means that, with respect to operating technology, air cooling of a gas turbine has significant advantages. There are no high investment costs for a powerful, permanently operating water processing system. This means that in practice permanent water injection is often foregone; steam cooling so far has not been able to become a standard. On the other hand, there is a latent desire to increase the power of a gas turbine by at least temporarily introducing water or steam—or another suitable medium—into the gas turbine cycle or temporarily saving cooling air in order to cover peak demand.

SUMMARY OF THE INVENTION

According to a first exemplary embodiment, a turbomachine comprises at least one heat generator having a fuel inlet, a compressed gas inlet, and a compressed hot gas outlet, wherein when fuel and compressed gas are combusted in the at least one heat generator, compressed hot gas flows out the compressed gas outlet in a hot gas stream, at least one turbine having an inlet in fluid communication with the heat generator compressed gas outlet, wherein when compressed hot gas is generated in the at least one heat generator, the compressed hot gas is expanded in the at least one turbine to produce mechanical power, a cooling system supplying at least one partial stream of an at least partially compressed gas to the hot gas stream, the at least one partial stream flowing to portions of the at least one heat generator, the at least one turbine, or both, that are subject to high thermal stress, prior to being added to the hot gas stream, the at least one partial stream flowing through the cooling system not being used for combustion, means for adding at least one second medium to the cooling system, the second medium displacing gas from the cooling system, the displaced gas therefore being available directly for thermal power conversion, and means for regulating the flow rate of the second medium as a function of a control deviation of the power.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which:

FIG. 1 schematically illustrates a view a gas turbine with a cooling air system according to the present invention; and FIG. 2 schematically illustrates an exemplary embodiment of the application of a gas turbine in accordance with the present invention with sequential combustion and intermediate expansion of the working medium.

DESCRIPTION OF THE PREFERRED EMBODIMENTS

Referring to the drawing figures, like reference numerals designate identical or corresponding elements throughout the several figures.

One object of the present invention is to provide a turbomachine of the above-mentioned type with the possibility of providing a larger quantity of air, or of another live gas, ior the combustion in order to temporarily increase power. This means that a larger fuel quantity can be fired without increasing the hot gas temperatures at the turbine inlet, resulting in higher power. In a turbomachine that is provided with means for introducing at least one other medium into the cooling system, this is achieved according to the present invention with means for regulating the flow rate of the second medium as a function of a power deviation.

In a first operating state, the turbomachine according to the present invention is cooled by a partial stream of compressed or partially compressed gas from the compressor. The power is regulated in known manner by varying the hot gas temperature at the turbine inlet and the drawn-in compressor air quantity. The turbomachine runs at nominal full load when there is a maximum draw-in live gas amount, and the hot gas temperature reaches an upper limit. To further increase power, a power regulator is activated which, as a function of the power deviation, controls a flow rate of a second medium into the cooling medium. This second medium, preferably water or steam, displaces live gas from the cooling system, so that this live gas is then directly available for thermal power conversion. A temperature regulator increases the fuel quantity to maintain the hot gas temperature at the upper limit. This increases the power of the turbomachine.

In the solution according to the invention the additional medium is not necessary permanently. This means that smaller quantities of this medium must be provided; meaning that, for example, a water processing plant can be designed smaller, and thus cheaper. This plant can be operated continuously, and processed water is stored for peak demand.

The turbomachine according to the present invention offers special advantages if it is used in a power plant.

The invention is explained in more detail below in reference to an example. Hereby reference is made directly to FIG. 2 since it also shows all of the characteristics that are shown in FIG. 1. The figure illustrates a gas turbine with two-stage sequential combustion, as it is known from EP 0 620 362, which describes an integrated component of the present embodiment. In the exemplary embodiment, a compressor 1 draws in an air quantity 6 from the environment. The compressor 1 provides compressed air 7 with a pressure $P_k$ and a temperature $T_k$ at its outlet 102. In a first heat generator 2, a fuel 12 is mixed in with the compressed air; combustion produces a hot gas 8 with a pressure $p_1$ and a temperature $T_1$ at the inlet 301 of a first turbine 3. in this first turbine, partial expansion to a pressure $p_2$ and a temperature $T_2$ takes place. In a second heat generator 4, an additional fuel quantity 13 is mixed and burned in the partially expanded hot gas 9 at the outlet 302 from the first turbine, whereby the pressure remains approximately constant, but the temperature at the inlet 501 into a second turbine 5 is increased to $T_3$ Expansion to a pressure $p_{ex}$ takes place in the turbine 5, whereby this pressure corresponds essentially to the ambient pressure; at the turbine outlet 502, the waste gas 11 still has the temperature $T_{ex}$. The waste gas 11 can be conducted directly into a chimney; alternatively it is, however, also possible that the latent heat energy can be used for steam generation in a waste heat boiler that is not shown here.

The turbines are located on a common shaft 15 through which they drive the compressor 1 and a generator 14. This exemplary embodiment does in no way restrict the design of the turbomachine. Naturally, two or more compressors with intermediate cooling may be present, or the generator can be connected to the turbomachine via a gear mechanism. It is just as possible to operate turbine 3 and compressor 1 on a common shaft with the heat generator 2 as a gas generator, and to operate turbine 5 with the generator and another mechanical load on a second shaft as a working turbine, etc.

FIG. 1 illustrates an embodiment of the present invention for a gas turbine with only one combustor. After explaining FIG. 2, FIG. 1 should be easily understandable by the skilled artisan.

Because of the high hot gas temperatures in the heat generators 2, 4 and in the turbines 3, 5, components that are subject to high thermal stress must be cooled there. In order to cool them, cooling media 28, 38, 48 are passed through the components to be cooled (not shown in detail here) and absorb the heat there; after this, the already heated cooling media are then again mixed with the working fluid 8, 9, 10 of the turbo machine. This means that cooling medium is also added at points with the highest pressure.

The minimum required pressure of the cooling medium is determined by the pressure at the point of admixture, whereby a required cooling mass flux must be ensured at predetermined throttle points inside the cooling system through the pressure head made available by the cooling system.

If the components are cooled at very different pressures, which is generally the case, it is advantageous that cooling medium is provided at accordingly adapted pressures. In the exemplary embodiment, three trains 21, 31, 41 of a cooling system are indicated, which in each case are connected with the compressor 1 at suitable pressure levels. The high pressure train 41 of the cooling system is connected to the compressor outlet 102. In particular if cooling air is removed at a very high pressure and the compressor works without intermediate cooling, this high pressure cooling air is present at comparatively high temperatures. It is then useful to first cool the compressed air removed for the purpose of cooling itself. For this purpose, a cooler 61 through which the high pressure cooling air 46 flows after it is removed from the compressor has been provided in the high pressure train 41 of the cooling system in this exemplary embodiment. Depending on the design of the system, the cooler 61 is not an obligatory component; on the other hand, other trains of the cooling system also may be equipped with coolers analogous to the cooler 61.

The cooling trains are provided with means for adding at least one additional cooling medium 25, 35, 45, for example, water or steam. These media are supplied via conduits 22, 32, 42, whereby regulating elements 24, 34, 44, and optionally shut-off elements 23, 33, 42 must be integrated in these conduits.

The useful addition of water or steam will be discussed below. First, the concept on which the increase in power is based, will be explained.

In nominal operation of the turbomachine, the control and shut-off elements 23, 24, 33, 34, 43, 44, are closed. Then only compressed air will flow as a pressure medium at various pressure levels to the heat generators 2, 4 and turbines 3, 5. To increase the power of the turbomachine, the drawn-in air quantity 6 on the one hand can be increased in this operation to the maximum quantity the compressor 1 is able to move; on the other hand, the fuel quantities 12, 13 supplied to the two combustors can be increased by opening the fuel control elements 18, 19. Temperatures $T_1$ and $T_3$ of the hot gas 8 at the inlet 301 of the first turbine 3, or respectively, of the hot gas 10 at the inlet 501 of the second turbine 5, which rise as a result, have an upper limit. It is not possible to measure these temperatures directly; rather, a temperature regulator 52 measures various pressures inside the machine, and the temperature $T_{ex}$ of the waste gas 11 at the outlet 502 of the last turbine, and determines the required hot gas temperatures from these values. If maximum power is required, the temperature regulator 52 uses the control values $Y_1$ and $Y_2$ to control the fuel quantities 12, 13 via control elements 18, 19 in such a way that the temperatures $T_1$ and $T_3$ will always be at the permissible upper limit given a maximum air quantity 6. In the process, however, it must be taken into account that not the entire drawn-in air stream 6 is available for thermal power conversion in the heat generators 2, 4, since in modern gas turbines with high process temperatures a significant partial stream of compressed air or partially compressed air is first removed from the process via conduits 21, 31, 41 as a cooling medium 28, 38, 48, and is then returned to it again bypassing the combustion.

In order to increase power, additional medium now can be mixed with the cooling air 26, 36, 46 via conduits 22, 32, 42. This additional medium is in the simplest case water that evaporates in the cooling air and, among other things, lowers its temperature. On the other hand, this may also be steam removed from a waste heat steam generator downstream from the turbomachine or the tapping steam of a steam turbine in a combination system, whereby it is useful that the removal points are in each case selected at a pressure that is adapted to the respective pressure in the cooling trains 21, 31, 41. Such a removal of steam for cooling purposes is known, for example, from EP 0 795 685, which is incorporated by reference in its entirety herein.

It should also be mentioned that the addition of water or steam to the cooling media 28, 38, 48 is probably always connected with losses in the degree of effectiveness, since in the case of a water injection, the latent heat contained in the waste gas 11 rises, and steam removed from a water/steam cycle could be used much more efficiently in a steam turbine. In contrast, a circuit and a method according to the present invention are able to significantly increase the delivery of power with almost no time delay, as is described below.

In case of peak demand, the power regulator 51 is activated. It compares a power delivery $P_{act}$ measured at the generator—this may also be the power delivery of a combination block—with a required power $P_{set}$ and responds to deviations by changing the control values $Y_3$, $Y_4$, and $Y_5$ which again act on the control elements 24, 34, 44. This means that if the actual power $P_{act}$ is smaller than the required power $P_{set}$, the control elements 24, 34, 44 are opened, and water or steam flows into the cooling system so that an air/steam mixture with a variable composition is present as a cooling medium 28, 38, 48. The water or steam quantities that are injected into the various trains 21, 31, 41 of the cooling system can be controlled independently from each other depending on the specific operating needs.

On the one hand, the power delivery of the turbomachine rises because of the mass flux flowing additionally through the turbines 3, 5. What is also relevant for the invention, however, is that the medium added to the cooling air displaces compressed air from the cooling system which then flows through the heat generators 2, 4. As a result, the temperatures $T_1$ and $T_3$ fall, and the temperature regulator 52 increases the fuel quantities 12, 13. This interaction of temperature regulator 52 and power regulator 51 causes the quantities of additional cooling medium and fuel to be increased successively until either the power delivery corresponds to the required power, or, in the extreme case, the entire cooling medium streams 28, 38, 48 consist only of steam. A flowing back of the cooling medium into the compressor 1 should be avoided, if at all possible.

As described in EP 0 795 685, cooling effectiveness is increased with steam-only cooling. This opens up an additional potential for a short-term power increase because the turbine inlet temperatures $T_1$ and $T_3$ are increased past their nominal limits.

Naturally, it is not obligatory that all cooling trains receive additional cooling medium; but this decision must be made as a result of a cost/benefit analysis based on a detailed process calculation. In the exemplary embodiment, it would, for example, be possible to provide only trains 31 and 41 with means for introducing another medium, while the low pressure train is operated exclusively with compressor air as a cooling medium.

If a cooler 61 is used, it is however in most cases useful that the additional medium is added downstream from this cooler. This minimizes the mass flux of the medium to be cooled; on the other hand, especially if the medium 45 also is cooler than the air removed from the compressor, the driving differential in temperature will be the greatest. Given certain thermodynamic boundary conditions and designs of the cooler, it was, however, also found to be useful that the medium 45 is added upstream from the cooler 61.

It can also be useful that water is used as a cooling medium 62 of the cooler 61, and to preheat this water or, if necessary, generate steam. The latter could be added either into the cooling system or could be used in the water/steam cycle of a combination plant.

Lastly, it should be mentioned that it is an advantage, if not even a requirement, when realizing the system according to the present invention, that the cooling system is located at least in part outside of the pressure cylinder of the turbomachine.

The device according to the invention is advantageously used in power plant turbines, both in simple gas turbine power plants and in combination systems. In a simple power plant, the power is simply increased in order to produce peak demand. In a combination power plant, the power delivery also can be increased briefly; but the use of a method according to the invention for increasing power also can be useful to reduce the response time of an entire combination system. The requirement to increase the block load from a load that is close to a full load to a full load can only be fulfilled with a relatively high expenditure of time because of the inertia of the steam generator and the steam turbine. Now, part of the steam can be used for cooling the steam turbine, which actually first decreases the steam turbine power, but spontaneously makes it possible for the gas turbine to provide more power. This increases the waste gas mass flux of the gas turbine, and the steam production is increased. To the same extent as the steam turbine power [Translator's Note: German says "leitung" ("conduit") here, not "leistung ("power")"], the gas turbine can then successively be returned to normal operation again.

While the invention has been described in detail with reference to preferred embodiments thereof, it will be apparent to one skilled in the art that various changes can be made, and equivalents employed, without departing from the scope of the invention.

What is claimed is:

1. A turbomachine comprising:
   A at least one heat generator having a fuel inlet, a compressed gas inlet, and a compressed hot gas outlet, wherein when fuel and compressed gas are combusted in the at least one heat generator, compressed hot gas flows out the compressed gas outlet in a hot gas stream;
   at least one turbine having an inlet in fluid communication with the heat generator compressed gas outlet, wherein when compressed hot gas is generated in the at least one heat generator, the compressed hot gas is expanded in the at least one turbine to produce mechanical power;
   a cooling system supplying at least one partial stream of an at least partially compressed gas to the hot gas stream, the at least one partial stream flowing to portions of the at least one heat generator, the at least one turbine, or both, that are subject to high thermal stress, prior to being added to the hot gas stream, the at least one partial stream flowing through the cooling system not being used for combustion;
   means for adding at least one second medium to the cooling system, the second medium displacing gas from the cooling system, the displaced gas therefore being available directly for thermal power conversion; and
   means for regulating the flow rate of the second medium as a function of a control deviation of the power.

2. A turbomachine according to claim 1, wherein the means for regulating the flow rate of the second medium include control elements and at least one power regulator, the power regulator having input values which include the actual power ($P_{act}$) as a control value and a required set power ($P_{set}$) as a guide value, the power regulator having starting values which include control values of the control elements for the adjustment of the quantity of the second medium as a function of the control deviation ($P_{act}-P_{set}$).

3. A turbomachine according to claim 1, further comprising a temperature regulator in communication with and which activates the power regulator when predetermined temperature limits are reached.

4. A turbomachine according to claim 1, wherein the second medium is steam.

5. A turbomachine according to claim 4, further comprising a waste heat boiler downstream from the turbomachine in order to generate steam.

6. A turbomachine according to claim 1, wherein the additional medium is water.

7. A turbomachine according to claim 1, further comprising a cooler in the cooling system.

8. A turbomachine according to claim 7, wherein the means for adding the second medium are positioned downstream from the cooler.

9. A turbomachine according to claim 1, wherein the at least one heat generator comprises at least two heat generators which are connected in series relative to the hot compressed gas stream so that compressed air flows into a first of the at least two heat generators, and compressed hot gas produced in the first heat generator flows successively through all heat generators following the first heat generator downstream;
   wherein a first turbine of the at least one turbine is positioned between two of the at least two heat generators, the first turbine partially expanding the hot compressed gas;
   wherein a last turbine of the at least one turbine is positioned downstream from a last heat generator of the at least two heat generators, the last turbine expanding the hot compressed gas to a final pressure ($P_{ex}$).

10. A turbomachine according to claim 1, wherein the cooling system comprises a plurality of separate trains including a first train and a second train, at least one heat generator and a first turbine of the at least one turbine being fluidly connected with the first train, at least a second heat generator of the at least one heat generator being arranged directly following the first heat generator, and a second turbine of the at least one turbine being fluidly connected with the second train.

11. A turbomachine according to claim 9, further comprises a common shaft, and wherein all of the turbines are arranged on the common shaft.

12. A turbomachine according to claim 1, further comprising a turbocompressor in fluid communication with the at least one heat generator compressed gas inlet.

13. A turbomachine according to claim 12, wherein the turbocompressor is driven by a turbine of the at least one turbine.

14. A turbomachine according to claim 13, further comprising a common shaft, that at least one turbine and the turbocompressor are arranged on the common shaft.

15. A process of using a turbomachine, comprising the steps of:
   providing a turbomachine according to claim 1 in a power plant; and
   driving a generator with the at least one turbine.

16. Method for operating a turbomachine, comprising the steps of:
   adding a fuel quantity to a compressed gas in at least one heat generator;
   expanding compressed hot gas in at least one turbine while providing mechanical power;
   passing at least one partial stream of an at least partially compressed gas in at least one cooling system around at least one heat generator in the turbomachiine as a first cooling medium for cooling machine components therein subject to hot gas,
   regulating power by the fuel quantity, the fuel quantity being terminated upon reaching a limit of the hot gas temperature;
   the regulating step comprising regulating with a power regulator to increase the power, the power regulator regulating a quantity of a second medium as a function of a control deviation ($P_{set}-P_{act}$) by means of control elements, the second medium being added to a cooling system and displaces the first cooling medium from this cooling system, the displaced first cooling medium being available for the combustion; and
   maintaining the hot gas temperature with a temperature regulator near the limit, the temperature regulator increasing the fuel quantity and therefore the power ($P_{act}$).

17. A method according to claim 16, further comprising regulating power with the power regulator by regulating the quantity of the second medium so that with the required power the temperature regulator exactly maintains the hot gas temperature at the limit.

18. A method according to claim 16, wherein the additional medium is steam, further comprising:
   removing steam to be added to the cooling system from a waste heat boiler, and that the point of removal from the waste heat boiler is chosen so that the pressure of the steam corresponds to the pressure of the compressed air in the cooling system.

19. A method according to claim 16, wherein the second medium is steam, and further comprising the step of:
   removing the steam to be added to the cooling system from a tapping point of a steam turbine, and that the point of removal is chosen in such a way that the pressure of the steam corresponds to the pressure of the compressed air in the cooling system.

20. A method according to claim 16, further comprising:
   increasing the limits of the hot gas temperature when another medium is added.

21. A method according to claim 16, wherein the turbomachine comprises
   at least two heat generators which in relation to the hot gas stream are connected in series so that compressed air flows into a first heat generator,
   a compressed hot gas produced in the first heat generator flows successively through all heat generators following downstream,
   between two heat generators a turbine is arranged in which a partial expansion of the hot gas takes place,
   downstream from a last heat generator a last turbine is located, in which last turbine an expansion of the hot gas to a final pressure ($P_{ex}$) takes place,
   a first heat generator and a first turbine include a first train of the cooling system, and at least a number of additional heat generators arranged directly following each other are equipped with another train of the cooling system, the trains of the cooling system being separate from each other,
   whereby the different trains of the cooling system work at different pressure levels,
   and further comprising the step of:
      adding the medium so that the pressure of the medium is adapted to the pressure in the respective train of the cooling system.

* * * * *